United States Patent
Farkas et al.

(10) Patent No.: US 10,855,807 B2
(45) Date of Patent: Dec. 1, 2020

(54) SYSTEMS AND METHODS FOR SEMI-AUTOMATIC WORKLOAD DOMAIN DEPLOYMENTS

(71) Applicant: VMware, Inc., Palo Alto, CA (US)

(72) Inventors: Keith Farkas, San Carlos, CA (US); Konstantin Ivanov Spirov, Sofia (BG); Ianislav Trendafilov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/258,466

(22) Filed: Jan. 25, 2019

(65) Prior Publication Data
US 2020/0244766 A1 Jul. 30, 2020

(51) Int. Cl.
*H04L 29/08* (2006.01)
*H04L 12/911* (2013.01)
*H04L 12/24* (2006.01)

(52) U.S. Cl.
CPC ............ *H04L 67/327* (2013.01); *H04L 41/22* (2013.01); *H04L 47/70* (2013.01); *H04L 67/1097* (2013.01)

(58) Field of Classification Search
CPC ... H04L 67/327; H04L 67/1097; H04L 41/22; H04L 41/70
See application file for complete search history.

(56) References Cited

U.S. PATENT DOCUMENTS

| | | | | |
|---|---|---|---|---|
| 2007/0067369 | A1* | 3/2007 | Minshall | G06F 11/3447 |
| 2011/0173302 | A1* | 7/2011 | Rider | G06F 9/44505 |
| | | | | 709/220 |
| 2011/0173303 | A1* | 7/2011 | Rider | G06F 9/44505 |
| | | | | 709/220 |
| 2015/0058400 | A1* | 2/2015 | Parikh | G06F 9/5094 |
| | | | | 709/203 |
| 2016/0170462 | A1* | 6/2016 | Shanmuganathan | G06F 1/28 |
| | | | | 713/340 |
| 2017/0255890 | A1* | 9/2017 | Palavalli | G06Q 10/06315 |
| 2018/0157532 | A1 | 6/2018 | Kumar et al. | |
| 2020/0004582 | A1* | 1/2020 | Fornash | G06F 9/5077 |

OTHER PUBLICATIONS

VMware vSAN Design and Sizing Guide 6.5, https://storagehub.vmware.com/export_to_pdf/vmware-r-virtual-santm-6-2-design-and-sizing-guide, 81 pgs., 2019.

* cited by examiner

*Primary Examiner* — Azizul Choudhury
(74) *Attorney, Agent, or Firm* — Loza & Loza, LLP

(57) ABSTRACT

A system and method for semi-automatic workload domain deployment in a computing environment uses a user host selection of at least one host computer for a workload domain to automatically recommend candidate host computers for the workload domain from available host computers using relative and absolute selection criteria. The relative selection criteria include criteria that are based on properties of any manually selected host computers, while the absolute selection criteria include criteria that are not based on properties of any manually selected host computers. Another user selection of at least one of the candidate host computers can then be made for the workload domain. The workload domain is deployed using the user host selections of the at least one hot computer and the at least one of the candidate host computers.

18 Claims, 10 Drawing Sheets

| Host ID | VC(*,1) | VC(*,2) | VC(*,3) | ... | VC(*,c) |
|---|---|---|---|---|---|
| 1 | VC(1,1) | VC(1,2) | VC(1,3) | ... | VC(1,c) |
| 2 | VC(2,1) | VC(2,2) | VC(2,3) | ... | VC(2,c) |
| 3 | VC(3,1) | VC(3,2) | VC(3,3) | ... | VC(3,c) |
| ... | ... | ... | ... | ... | ... |
| n | VC(n,1) | VC(n,2) | VC(n,3) | ... | VC(n,c) |

Fig. 7

SYSTEMS AND METHODS FOR SEMI-AUTOMATIC WORKLOAD DOMAIN DEPLOYMENTS

BACKGROUND

Virtualization of physical computer systems provides numerous benefits such as the execution of multiple virtual computer systems on a single physical computer, the replication of virtual computer systems, the extension of virtual computer systems across multiple physical computers, etc. Such virtualization of physical computer system allows for creation of workload domains. A workload domain is an abstraction that can be applied to a number of different types of compute workloads, which allows an administrator to deploy capacity for specific workload types using a policy-driven approach on top of modular, standardized physical computers. A workload domain has a set of policies that are configurable by a user during the deployment process, such as desired levels of availability, performance and storage. In order to create a workload domain or expand an existing workload domain, an administrator typically has to manually select physical computers to be used for that workload domain from a pool of available physical computers.

Manual selection of physical computer for workload domain creation or expansion, however, can be time consuming and burdensome when the number of physical computers is high and the physical computers have varying capabilities and capacities. This is the situation developing in modern data centers as new physical computers are installed with the older physical computers.

SUMMARY

A system and method for semi-automatic workload domain deployment in a computing environment uses a user host selection of at least one host computer for a workload domain to automatically recommend candidate host computers for the workload domain from available host computers using relative and absolute selection criteria. The relative selection criteria include criteria that are based on properties of any manually selected host computers, while the absolute selection criteria include criteria that are not based on properties of any manually selected host computers. Another user selection of at least one of the candidate host computers can then be made for the workload domain. The workload domain is deployed using the user host selections of the at least one hot computer and the at least one of the candidate host computers.

A computer-implemented method for semi-automatic workload domain deployment in a computing environment in accordance with an embodiment of the invention comprises receiving a request to deploy a workload domain, displaying available host computers for the workload domain, receiving a user host selection of at least one of the available host computers, when an auto-recommend setting is enabled, computing relative and absolute selection criteria for automatic host recommendation from the available host computers that have not been manually selected, the relative selection criteria including criteria that are based on properties of any manually selected host computers, the absolute selection criteria including criteria that are not based on the properties of any manually selected host computers, analyzing the available host computers that have not been manually selected using the relative and absolute selection criteria to automatically recommend candidate host computers, each of the candidate host computers meeting at least one of the relative and absolute selection criteria, displaying the candidate host computers for user selection, receiving another user host selection of at least one of the candidate host computers, and deploying the workload domain using at least the user host selections of the at least one of the available host computers and the at least one of the candidate host computers. In some embodiments, the steps of this method are performed when program instructions contained in a non-transitory computer-readable storage medium are executed by one or more processors.

A system in accordance with an embodiment of the invention comprises memory and at least one processor configured to receive a request to deploy a workload domain, display available host computers for the workload domain, receive a user host selection of at least one of the available host computers, when an auto-recommend setting is enabled, compute relative and absolute selection criteria for automatic host recommendation from the available host computers that have not been manually selected, the relative selection criteria including criteria that are based on properties of any manually selected host computers, the absolute selection criteria including criteria that are not based on the properties of any manually selected host computers, analyze the available host computers that have not been manually selected using the relative and absolute selection criteria to automatically recommend candidate host computers, each of the candidate host computers meeting at least one of the relative and absolute selection criteria, display the candidate host computers for user selection, receive another user host selection of at least one of the candidate host computers, and deploy the workload domain using at least the user host selections of the at least one of the available host computers and the at least one of the candidate host computers.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 7 illustrates an example of an output of the automatic host recommendation process in the form of a table in accordance with an embodiment of the invention.

Throughout the description, similar reference numbers may be used to identify similar elements.

DETAILED DESCRIPTION

Cloud computing is based on the deployment of many physical resources across a network, virtualizing the physical resources into virtual resources, and provisioning the virtual resources for use across cloud computing services and applications, which may involve deploying workload domains. Example systems for supporting workload domains are described in U.S. patent application Ser. No. 15/585,172, titled "METHODS AND APPARATUS TO MANAGE WORKLOAD DOMAINS IN VIRTUAL SERVER RACKS" filed May 3, 2017. For its descriptions of cloud computing technologies using workload domains and other teachings, patent application Ser. No. 15/585,172 is herein included by reference in its entirety.

Figure 1:
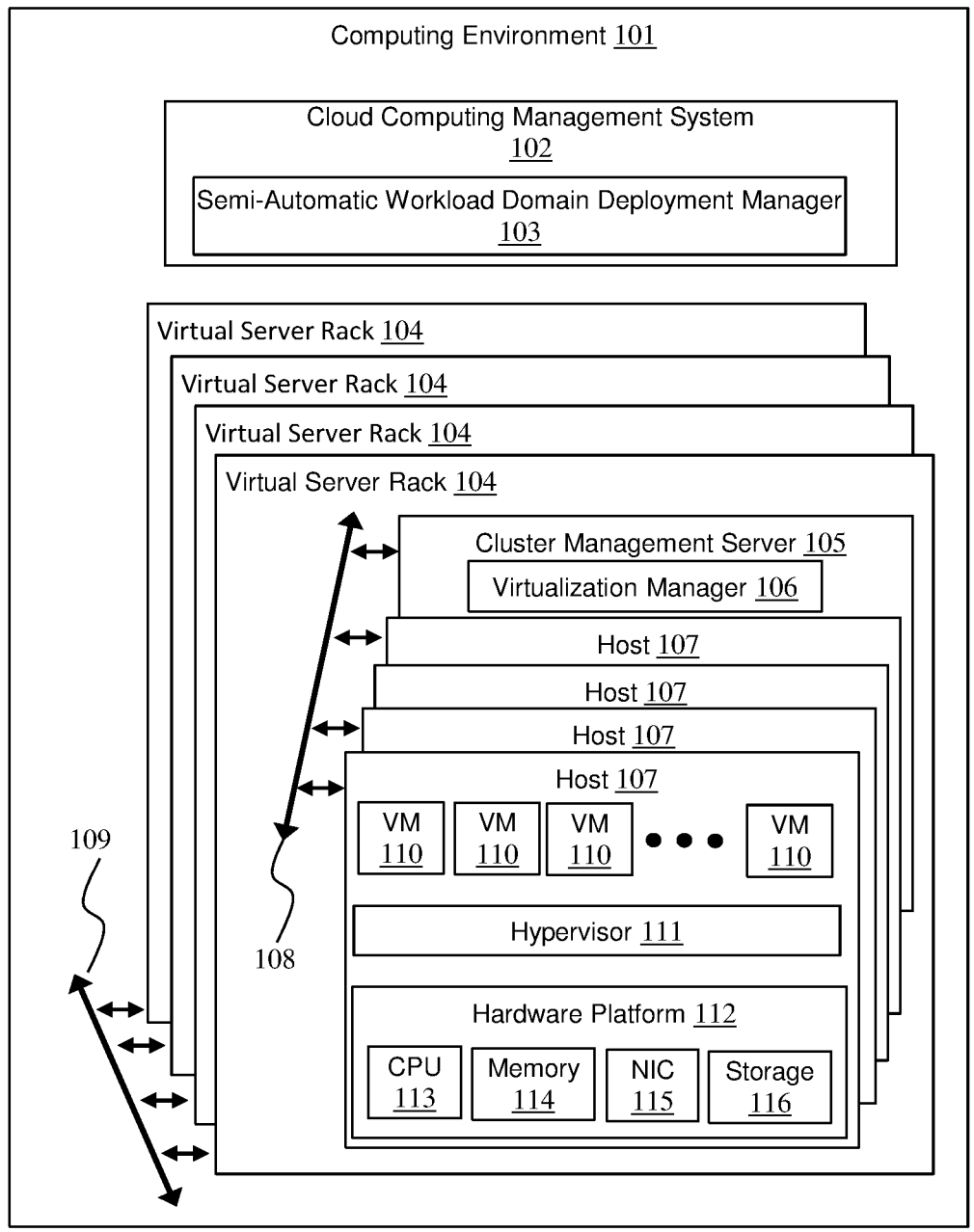
FIG. 1 is a block diagram of a computing environment with a semi-automatic workload domain deployment manager in accordance with an embodiment of the invention.

Turning now to FIG. 1, a block diagram of a computing environment 101 with a semi-automatic workload domain deployment manager 103 in accordance with an embodiment of the invention is shown. The computing environment 101 can be used to create and manage workload domains for cloud computing solutions. As described in detail below, the semi-automatic workload domain deployment manager 103 facilitates a semi-automated process for selecting host computers for deployment of workload domains, which reduces complexity of the workload domain deployment operation, as well as the time for users to learn about the workload domain deployment operation.

As shown in FIG. 1, the computing environment 101 includes a number of virtual server racks 104 with each virtual server rack containing a number of host computers 107, which are sometimes referred to herein simply as "hosts". The virtual server racks 104 are physical racks, holding physical computers, physical networking gear, and possibly other cloud computing elements, such as network attached storage (NAS) devices, storage area network (SAN) devices, or other storage devices. The network gear provides an internal network 108 inside each virtual server rack 104 over which the hosts 107 communicate. The network gear also provides an external network 109 over which the hosts 107 in different virtual server racks 104 can communicate with each other and the outside world.

The hosts 107 may be constructed on a server grade hardware platform 112, such as an x86 architecture platform. As shown, the hardware platform of each host may include conventional components of a computing device, such as one or more processors (e.g., CPUs) 113, system memory 114, a network interface 115, storage 116, and other I/O devices such as, for example, a mouse and a keyboard (not shown). The processor 113 is configured to execute instructions, for example, executable instructions that perform one or more operations described herein and may be stored in the memory 114 and the storage 116. The memory 114 is volatile memory used for retrieving programs and processing data. The memory 114 may include, for example, one or more random access memory (RAM) modules. The network interface 115 enables the host 107 to communicate with another device via a communication medium, such as a network 122 within the private cloud computing environment. The network interface 115 may be one or more network adapters, also referred to as a Network Interface Card (NIC). The storage 116 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage 116 is used to store information, such as executable instructions, cryptographic keys, virtual disks, configurations and other data, which can be retrieved by the host.

Each host 107 may be configured to provide a virtualization layer that abstracts processor, memory, storage and networking resources of the hardware platform 112 into virtual computing instances, e.g., virtual machines 110, that run concurrently on the same host. The virtual machines run on top of a software interface layer, which is referred to herein as a hypervisor 111, that enables sharing of the hardware resources of the host by the virtual machines. One example of the hypervisor 111 that may be used in an embodiment described herein is a VMware ESXi™ hypervisor provided as part of the VMware vSphere® solution made commercially available from VMware, Inc. The hypervisor 111 may run on top of the operating system of the host or directly on hardware components of the host. For other types of virtual computing instances, the host may include other virtualization software platforms to support those virtual computing instances, such as Docker virtualization platform to support software containers.

As illustrated in FIG. 1, one of the hosts 107 in each virtual server rack 104 can be designated as a cluster management server 105. The cluster management server 105 can run a virtualization manager 106 which can be software that interacts with the hypervisors 111 of the hosts 107 in the same virtual server rack 104 to thereby coordinate the creation, starting, running, shutdown, and deletion of virtual machines 110 and to otherwise provision, manage and monitor resources within that virtual server rack 104. The virtualization manager 106 can be an application program running on a virtual computing instance, such as a virtual machine, in the cluster management server 105 that can communicate with the hypervisors 111 of the hosts 107 in the same virtual server rack 104 using the internal network 108 and the external network 109. The cluster management server 105 may include additional virtual computing instances, such as virtual machines, running various other application programs. As an alternative, the virtualization manager 106 may be an application program running directly on the physical hardware of the cluster management server 105, not on a virtual computing instance.

The computing environment 101 also includes a cloud computing management system 102 with the semi-automatic workload domain deployment manager 103. The cloud computing management system 102 operates to provision, manage and monitor the physical and logical resources within the computing environment 101 to manage workload domains deployed in the computing environment. The cloud computing management system 102 can be implemented as software running on any computing system in the computing environment 101, such as one of the hosts 107 or one of the virtual machines 110 running on any host 107 in the virtual server racks 104. In some embodiments, the cloud computing management system 102 may be implemented as a group of cooperating software programs running on numerous hosts and/or virtual machines in the computing environment 101, and communicating via the networks 108 and 109.

The semi-automatic workload domain deployment manager 103 operates to execute a semi-automatic workload domain deployment operation in which candidate hosts for a workload domain can be automatically recommended for user selection based on one or more hosts that have been manually selected. Thus, the semi-automatic workload domain deployment manager 103 alleviates the need for a user to manually select each host for a workload domain from an unmanageably large pool of available hosts. In addition, since candidate hosts are automatically recommended based on one or more manually selected hosts, the automatic host recommendation process is significantly simplified when compared to a fully automatic host recommendation process without the benefit of basing host recommendations on any manually selected hosts. The semi-automatic workload domain deployment manager 103 can be a component of the cloud computing management system 102, as illustrated in FIG. 1, or can be a separate software application that can interact with cloud computing management system 102. The semi-automatic workload domain deployment manager 103 and its operation are described in more detail below.

Figure 2:
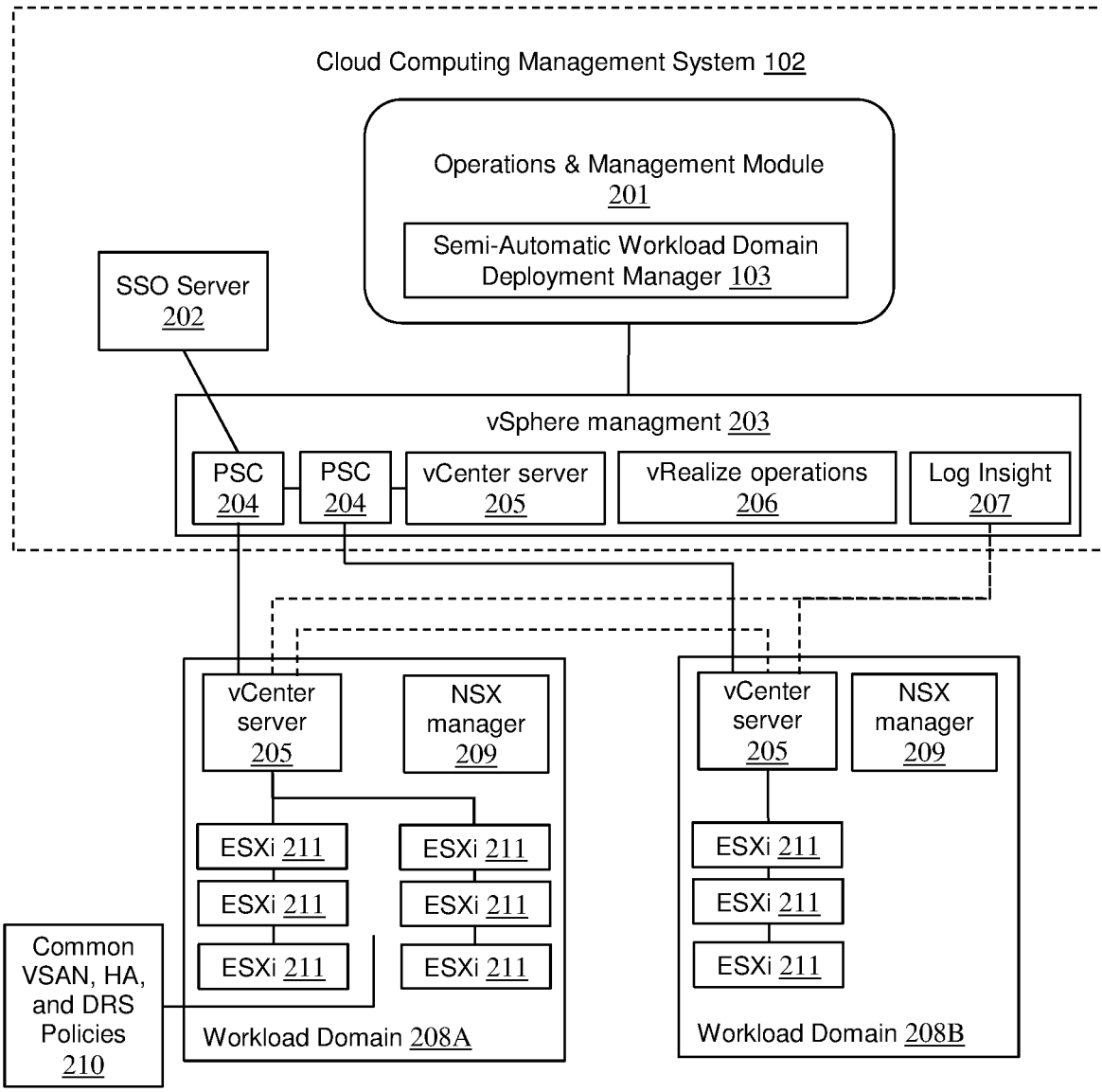
FIG. 2 illustrates components of a cloud computing management system in the computing environment in accordance with an embodiment of the invention.

FIG. 2 illustrates components of the cloud computing management system 102 in accordance with an embodiment of the invention. As shown in FIG. 2, the cloud computing management system 102 includes an operations and management module 201 with the semi-automatic workload domain deployment manager 103 and VMware vSphere® management module 203. In one implementation, the operations and management module 201 is a VMware EVO™ SDDC™ manager. These components of the cloud computing management system 102 operate to create and manage workload domains, such as workload domains 208A and 208B.

The workload domains 208A and 208B can be created based on user inputs that specify one or more of domain type, security, availability requirements, performance requirements, and capacity requirements. Based on these user inputs, the operations and management component 201 can determine whether deployment of the workload domains 208A and 208B is possible. If deployment is possible, the operations and management component 201 can deploy the workload domains 208A and 208B with suitable management components, capacity, and settings that meet the user-specified requirements with the assistance of the VMware vSphere® management module 203.

The VMware vSphere® management module 203 can use a suite of virtualization infrastructure components, such as platform services controllers (PSCs) 204, a vCenter® server 205, a vRealize® operations component 206, and a Log Insight™ component 207. The vCenter® server 205 is a centralized management application that administrators can use to manage ESXi™ hypervisors 211, which may be running on the hosts 107 in the virtual server racks 104. The VMware vRealize® operations component 206 is an example of a software platform that can help administrators build and manage heterogeneous hybrid clouds. The Log Insight™ component 207 is a tool that provides for the collection, viewing, managing, and analysis of log data such as syslog data generated within ESXi™ hypervisors 211. The PSC 204 can provide infrastructure security capabilities such as single sign on (SSO), which can be configured with an active directory server 202 that administrators can use to grant user access to the management application in the vSphere management module 203.

As shown in FIG. 2, each of the workload domains 208A and 208B includes a number of the ESXi™ hypervisors 211 running on selected hosts 107 in the virtual server racks, which are managed by the vCenter® server 205 running in that workload domain. Each of the workload domains 208A and 208B also includes a VMware NSX® manager 209, which manages logical networking resources for that workload domain. Each of the workload domains 208A and 208B may be governed by policies 201, which may include common virtual storage area network (VSAN), (high availability) HA, and distributed resource scheduler (DRS) policies. VSAN policies can govern the properties of virtual storage made available to the hosts 107 or virtual machines 110. HA policies can govern the detection of failed hosts and virtual machines, and the relaunching of failed virtual machines. DRS policies can govern the migration of virtual machines amongst hosts based on virtual machine workloads and host capacities. These policies for each workload domains 208A and 208B may be specified and changed by user input.

In order to deploy workload domains, such as the workload domains 208A and 208B, in the computing environment 101, some of the available hosts 107 in the virtual server racks 104 have to be selected for the workload domains. As described in detail below, the semi-automatic workload domain deployment manager 103 facilitates a semi-automated process of selection hosts for workload domain deployment, which may be for creating a new workload domain or expanding an existing workload domain.

A semi-automatic workload domain deployment operation executed by the semi-automatic workload domain deployment manager 103 is described with reference to a process flow diagram of FIGS. 3A-3C in accordance with an embodiment of the invention. At block 301, a workload domain deployment is initiated in response to a user request to deploy a workload domain. In an embodiment, the user request for the workload domain deployment can be made using a computer system on which the semi-automatic workload domain deployment manager 103 is running or using any computer system that can connect to the semi-automatic workload domain deployment manager. Next, at block 302, the type of workload domain to be deployed is received in response to another user input. Domain types may include an infrastructure as a service (IaaS) domain type, a platform as a service (PaaS) domain type, a desktop as a service (DaaS)/virtual desktop infrastructure (VDI) domain type, a development/test domain type, a production domain type, a Cloud Native domain type, an Open stack domain type, and a Big Data domain type.

Next, at block 303, options for the workload domain, including storage type, performance and/or location options, are displayed for user selection. The options for the workload domain may further include the total availability, performance, RAM memory size, and storage size for the workload domain, which can be represented as total metric values. Some of these options may correspond to properties of the workload domain that can be combined across selected hosts as accumulation metrics. In an embodiment, these options for the workload domain and other information for the workload domain deployment operation may be displayed on a user interface on a display device (not shown) for the user.

Availability and performance are examples of properties that can be combined across hosts as accumulation metrics.

Availability requirements refer to durations of continuous operation expected for a workload domain. Example availability requirements also refer to configuring workload domains so that one workload's operability (e.g., malfunction, unexpected adverse behavior, or failure) does not affect the availability of another workload in the same workload domain. Performance requirements refer to storage configuration (e.g., in terms of megabytes (MB), gigabytes (GB), terabytes (TB), etc.), CPU operating speeds (e.g., in terms of megahertz (MHz), gigahertz (GHz), etc.), and power efficiency settings. CPU operating speeds are often an aggregate of the speeds of all the cores in a CPU. For example, a host with a single 1 GHz CPU having six cores would be interpreted as having 6 GHz of CPU operating speed or simply 6 GHz CPU. Example performance requirements also refer to configuring workload domains so that concurrent workloads in the same workload domain do not interfere with one another. Such non-interference between concurrent workloads may be a default feature or may be user-specified to different levels of non-interference. The performance and availably of selected hosts can be combined to form accumulation metrics. The accumulation metrics increase as more hosts are selected and meets the user's requirements when enough hosts are selected. Thus, as hosts are added to a workload domain, properties metric values for the hosts in the workload domain can be accumulated to derive accumulation metric values for the different properties. Determining the accumulation metric value is a prerequisite to determining if a goal for a workload domain has been met for a particular property.

Next, at block 304, user-selected options for the workload domain are received. Next, at block 305, a list of hosts that match the user-selected location and/or storage options is obtained. In an embodiment, the list of hosts may be obtained by invoking a resource manager (not shown) running in the vSphere management module 203 that can determine which hosts meet the desired storage type and/or location and return the hosts meeting the desired options. As used herein, "returning a host" means that information sufficient to uniquely identify the host is returned, such as host name and identification (ID). Next, at block 306, the returned hosts are displayed for user selection. It is noted here that the list of returned hosts can include a single host or multiple hosts.

Next, at block 307, a first host selection made by the user is received and added to the workload domain. The host selection may include multiple hosts manually selected by the user from a pool of available hosts, which may include hosts from existing workload domains, to be added to the workload domain being deployed. The manual process of making a host selection may involve selecting and deselecting any number of hosts to derive one or more selected hosts for the host selection. Next, at block 308, warning and error messages are obtained if there are any issues regarding the host selection for the workload domain. In an embodiment, the workload domain policy rules may be applied by invoking a rules engine (not shown) running in the vSphere management module 203 that examines the user-selected host or hosts with respect to the workload domain policy rules to issue warning and error messages when needed. For example, the rules engine may use validation rules to warn the user of issues with the selections or errors that prevent the use of the selected host. Example of rules that generate error messages can include hybrid and all flash hosts in the same cluster, mixing Intel and AMD CPUs, mixing EVC and no-EVC hosts. EVC refers to Enhanced vMotion Compatibility where vMotion® is a VMware® utility that can migrate virtual machines between hosts. Examples of rules that generate warning messages can include selection of hosts with different disk size and selection of hosts with different memory size.

Next, at block 309, accumulation metrics for the workload domain are computed. In an embodiment, the accumulation metrics may be computed/updated by invoking a display manager (not shown) running in the vSphere management module 203 that computes accumulation metrics for the workload domain when a host is added to or deleted from the workload domain. Next, at block 310, the warning and error messages, if any, and the computed accumulation metrics for the workload domain are displayed for the user.

Next, at block 311 (shown in FIG. 3B), an option for an auto-recommend setting of the semi-automatic workload domain deployment manager 103 is displayed for user selection. If the auto-recommend setting is enabled, any additional hosts for the workload domain will be automatically selected by the semi-automatic workload domain deployment manager 103 and recommended for user selection. However, if the auto-recommend setting is not enabled, any additional hosts for the workload domain can be manually selected by the user from the entire pool of available hosts. In some embodiment, the option to enable the auto-recommend setting may continually be available to the user during the operation when hosts are being selected for the workload domain.

Next, at block 312, a determination is made whether the auto-recommend setting has been enabled. If the auto-recommend setting is not enabled, the operation proceeds to block 313, where a determination is made whether any error message has been generated or returned. If there are no error messages, an option to enable a deploy workload domain setting of the semi-automatic workload domain deployment manager 103 is displayed for user selection, at block 314.

Next, at block 315, a determination is made whether the deploy workload domain setting is enabled. If the deploy workload domain setting is enabled, the workload domain is deployed using the selected hosts, at block 316. In an embodiment, the workload domain is deployed by invoking a deploy workload domain operation routine in the vSphere management module 203. The deploy workload domain operation routine may involve creating the workload domain as a new workload domain or as an expansion of an existing workload domain, which may involve deploying a vCenter server 205 and a VMware NSX® manager 209, as illustrated in FIG. 2. The operation then comes to an end, at block 317.

If the deploy workload domain is not enabled or one or more error messages have been generated, the operation proceeds to block 318, where the next host selection made by the user is received, similar to block 307. This host selection may involve selecting new hosts and/or deselecting one or more of the previously selected hosts. For example, an incompatible host may be deselected by the user to remove it from the workload domain. The operation then proceeds to blocks 319-321, which are similar to blocks 308-310. Thus, at block 319, warning and error messages obtained if there are any issues regarding the selected hosts for the workload domain. At block, 320, the accumulation metrics for the workload domain are computed/updated based on the selected hosts. Next, at block 321, the warning and error messages, if any, and the updated accumulation metrics for the workload domain are displayed for the user. The operation then loops back block 311 so that more hosts can be selected/deselected for the workload domain or the workload domain can be deployed using the selected hosts.

If at block 312, it is determined that the auto-select setting is enabled, the operation proceeds to optional block 322 (shown in FIG. 3C), where already selected hosts are displayed for user modification of the automatic host recommendation process to be executed. As used herein, "already selected hosts" are hosts that have been manually selected by the user, which may include hosts that have been previously recommended by the automatic host recommendation process and manually selected by the user. Thus, the user can control the underlying host computers that will be used by the automatic host recommendation process to recommend additional host computers that can be added to the desired workload domain. An advantage of such user modification is that specific selected host computers that are much different than other selected host computers can be removed from being considered for the automatic host recommendation process.

Next, at block 323, an automatic host recommendation process is executed by the semi-automatic workload domain deployment manager 103 to recommend one or more hosts that can be added to the workload domain based on any hosts already selected. In one embodiment, the automatic host recommendation process uses only the hosts initially selected manually at block 307. In another embodiment, the automatic host recommendation process may additionally include one or more hosts that have been previously recommended by the automatic host recommendation process and manually selected by the user. In still another embodiment, the automatic host recommendation process may include only the selected hosts that have been indicated by the user at block 322. The automatic host recommendation process is described in detail below with reference to FIGS. 4-6. Next, at block 324, one or more hosts resulting from the automatic host recommendation process are displayed for user selection. In some embodiments, the automatic host recommendation process may also generate warning and error messages, if any, with respect to the recommended hosts, which are then displayed to help the user with selecting the right hosts from the recommended hosts.

Next, at block 325, a determination is made whether any of the resulting recommended hosts have been user selected. If any of the recommended hosts have been selected, the operation then proceeds to blocks 326-328, which are similar to blocks 308-310. Thus, at block 326, warning and error messages, if any, are obtained based on the selected hosts for the workload domain. At block, 327, the accumulation metrics for the workload domain are computed/updated based on the selected hosts. Next, at block 328, the warning and error messages, if any, and the updated accumulation metrics for the workload domain are displayed for the user. In addition, at block 328, the selection status of the selected hosts, if any, may be set to "selected". The operation then loops back block 311 so that more hosts can be selected to be added to the workload domain or the workload domain can be deployed using the selected hosts.

However, if no hosts resulting from the automatic host recommendation process are selected, the operation bypasses blocks 326-328 and proceeds directly to block 311 (shown in FIG. 3B) so that more hosts can be selected/deselected for the workload domain or the workload domain can be deployed using the selected hosts. In some embodiments, if no hosts resulting from the automatic host recommendation process are selected, an information message may be displayed to indicate that no hosts have been selected.

Figure 3A:
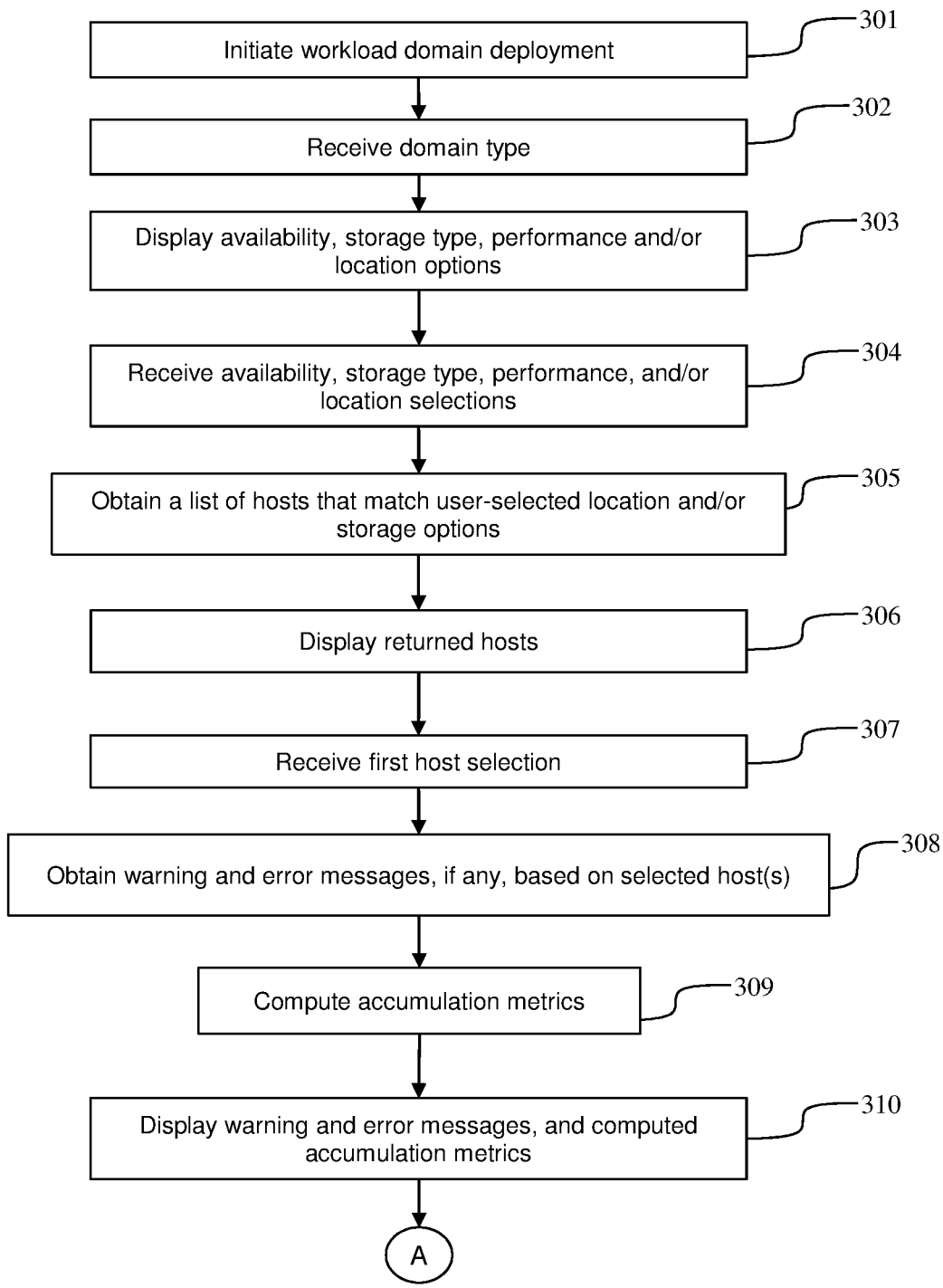
FIGS. 3A-3C illustrate a process flow diagram of a semi-automatic workload domain deployment operation executed by the semi-automatic workload domain deployment manager in accordance with an embodiment of the invention.
Figure 3B:
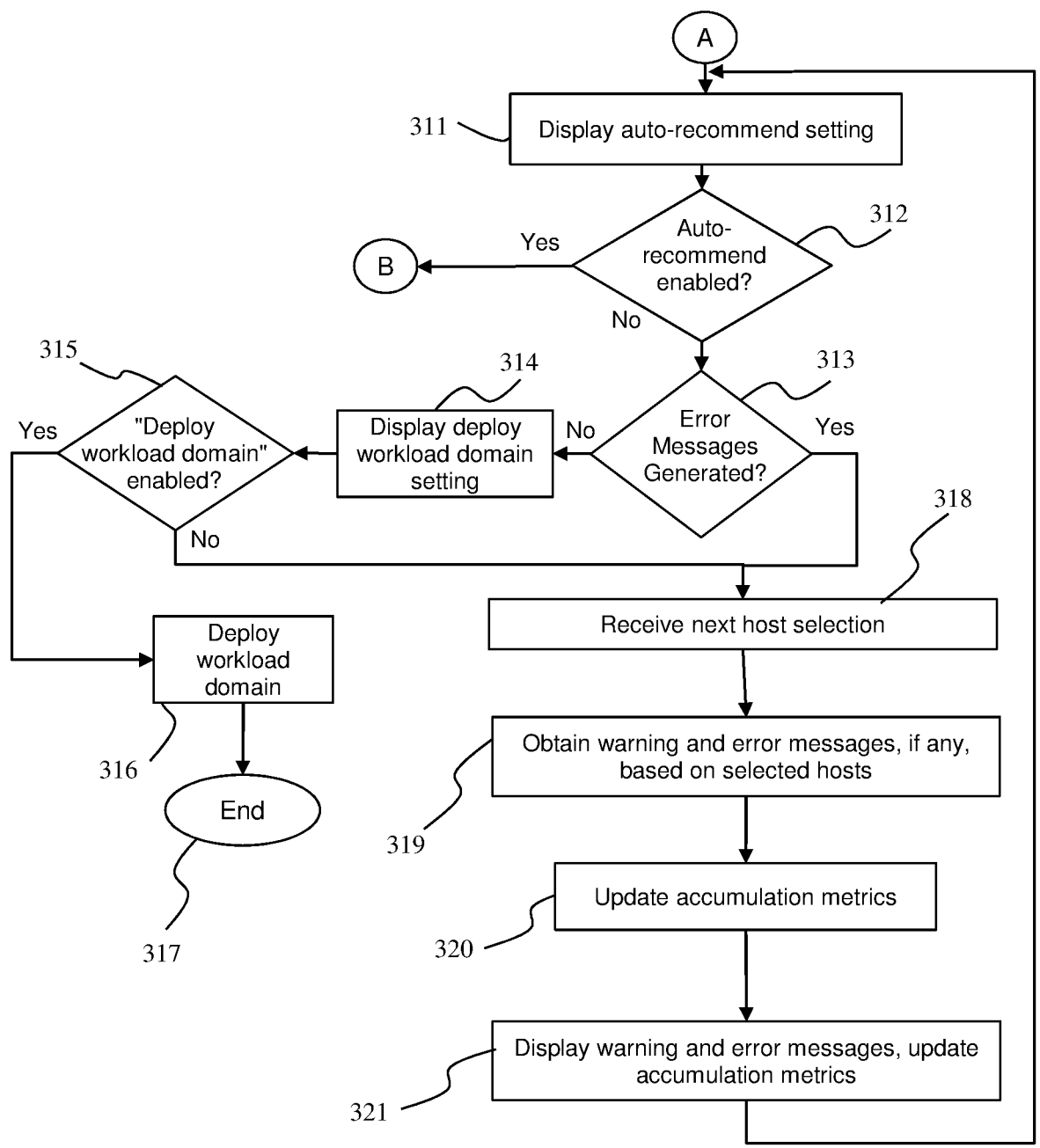
Figure 3C:
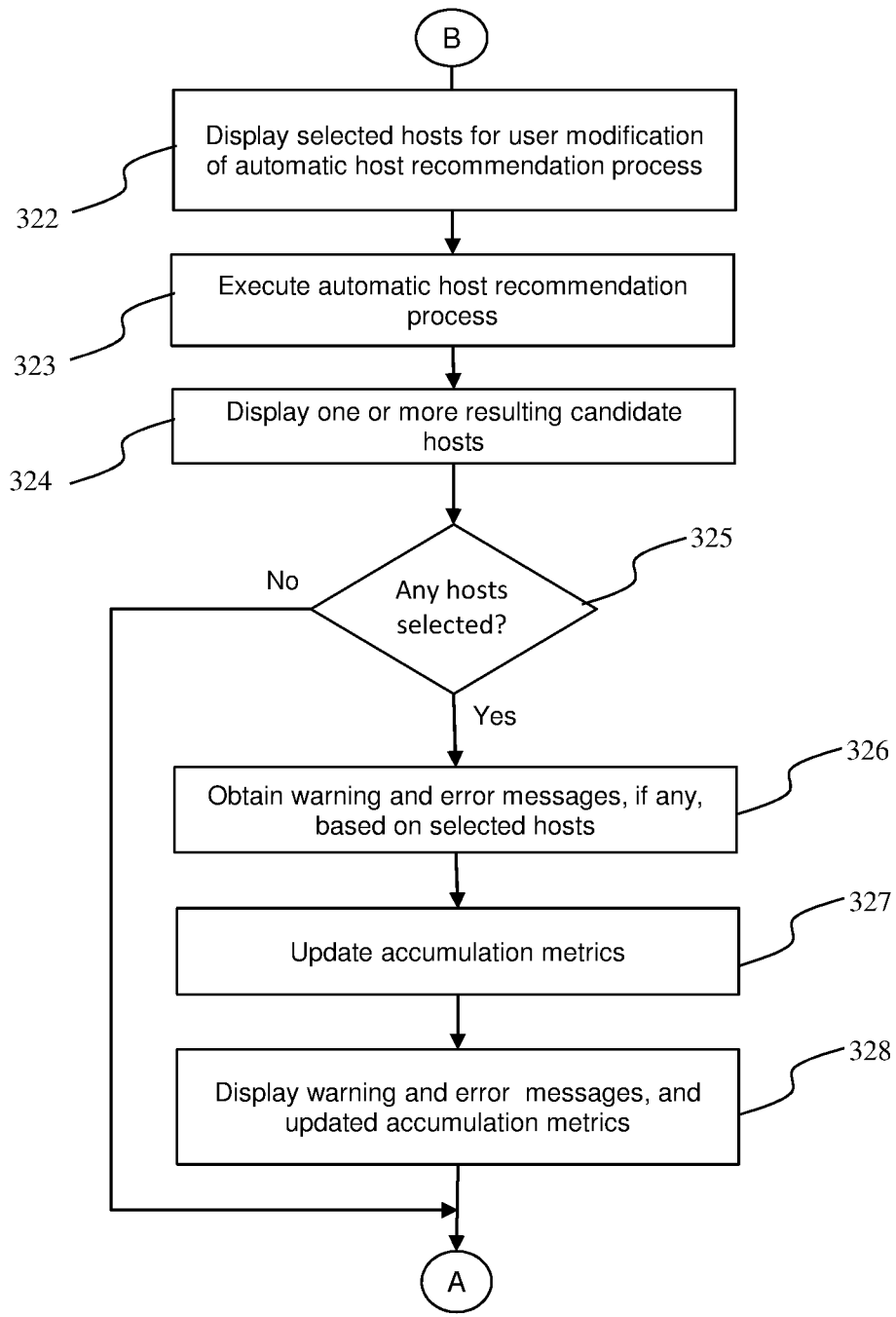
Figure 4:
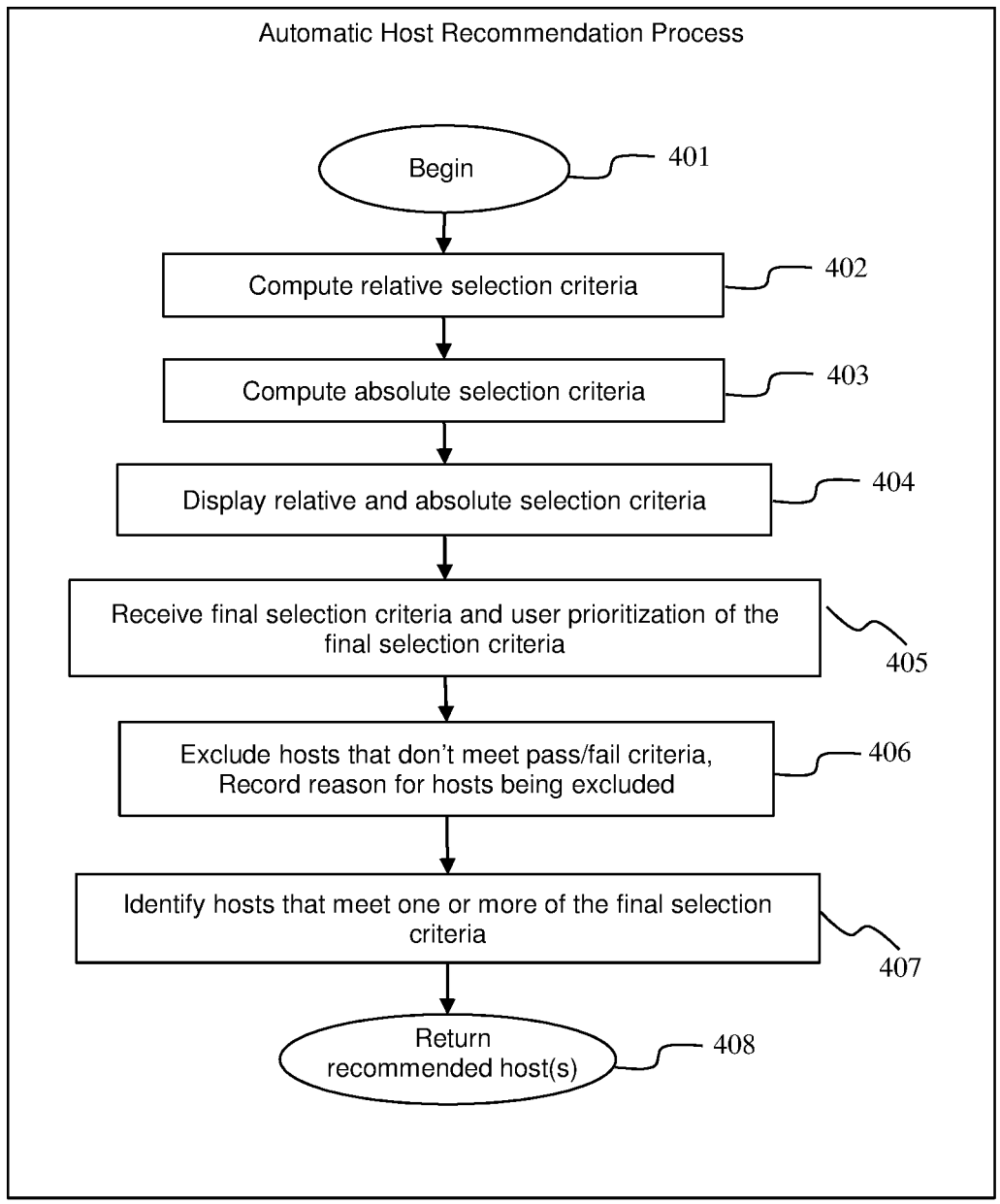
FIG. 4 is a process flow diagram of the automatic host recommendation process executed during the semi-automatic workload domain deployment operation in accordance with an embodiment of the invention.

FIG. 4 is a process flow diagram of the automatic host recommendation process, which is executed at block 323 in the semi-automatic workload domain deployment operation illustrated in FIGS. 3A-3C, in accordance with an embodiment of the invention. The automatic host selection process begins at block 401 in response to the auto-recommend setting being enabled. Next, at block 402, relative selection criteria for the workload domain are computed, which is described in detail with reference to FIG. 5. Relative selection criteria that are dependent and based on the properties of one or more already selected hosts, which may involve comparisons between the properties of an available host to the properties of one or more already selected hosts, which may include hosts that have been previously recommended by the automatic host recommendation process and manually selected by the user. Comparisons of memory size, processor count, storage, and health metrics of available hosts can be made to statistical measures of corresponding properties of one or more already selected hosts for a workload domain, as described below. As used in this context, storage can refer to storage properties of a host or a workload domain, such as storage size, storage device type(s), and number of storage devices.

Next, at block 403, absolute selection criteria for the workload domain are computed, which is described in detail with reference to FIG. 6. Absolute selection criteria including criteria that are not dependent or based on the properties of any manually selected host computers. Thus, absolution selection criteria are not affected by the properties of any already selected hosts for a workload domain.

Next, at block 404, the computed relative and absolute selection criteria are displayed for user input. In some embodiments, the user may delete one or more of the computed selection criteria, edit one or more the computed selection criteria and/or add one or more new selection criteria, which may subsequently be deleted or edited, to produce a set of final selection criteria. The user can then prioritize the final selection criteria to be used for the automatic host selection. Some selection criteria may be pass/fail criteria, such as location, storage device type, CPU type, memory size, health metric, etc. wherein a host must meet each pass/fail selection criterion in order to be recommended for the workload domain.

Next, at block 405, the final selection criteria for the workload domain and the user prioritization of the final selection criteria are received in response to user input. Next, at block 406, one or more hosts that do not meet any pass/fail selection criteria are excluded from a list of potential hosts. Next, at block 407, one or more hosts that meet the one or more of the final selection criteria are identified by analyzing the properties of the potential hosts against the final selection criteria, which includes the relative and absolute selection criteria. In addition, for each host that does not meet all the final criteria, the criteria that are not met, including reasons why the criteria are not met, are recorded. Next, at block 408, the identified hosts that meet the one or more of the final selection criteria are returned as recommended hosts for user selection.

Figure 5:
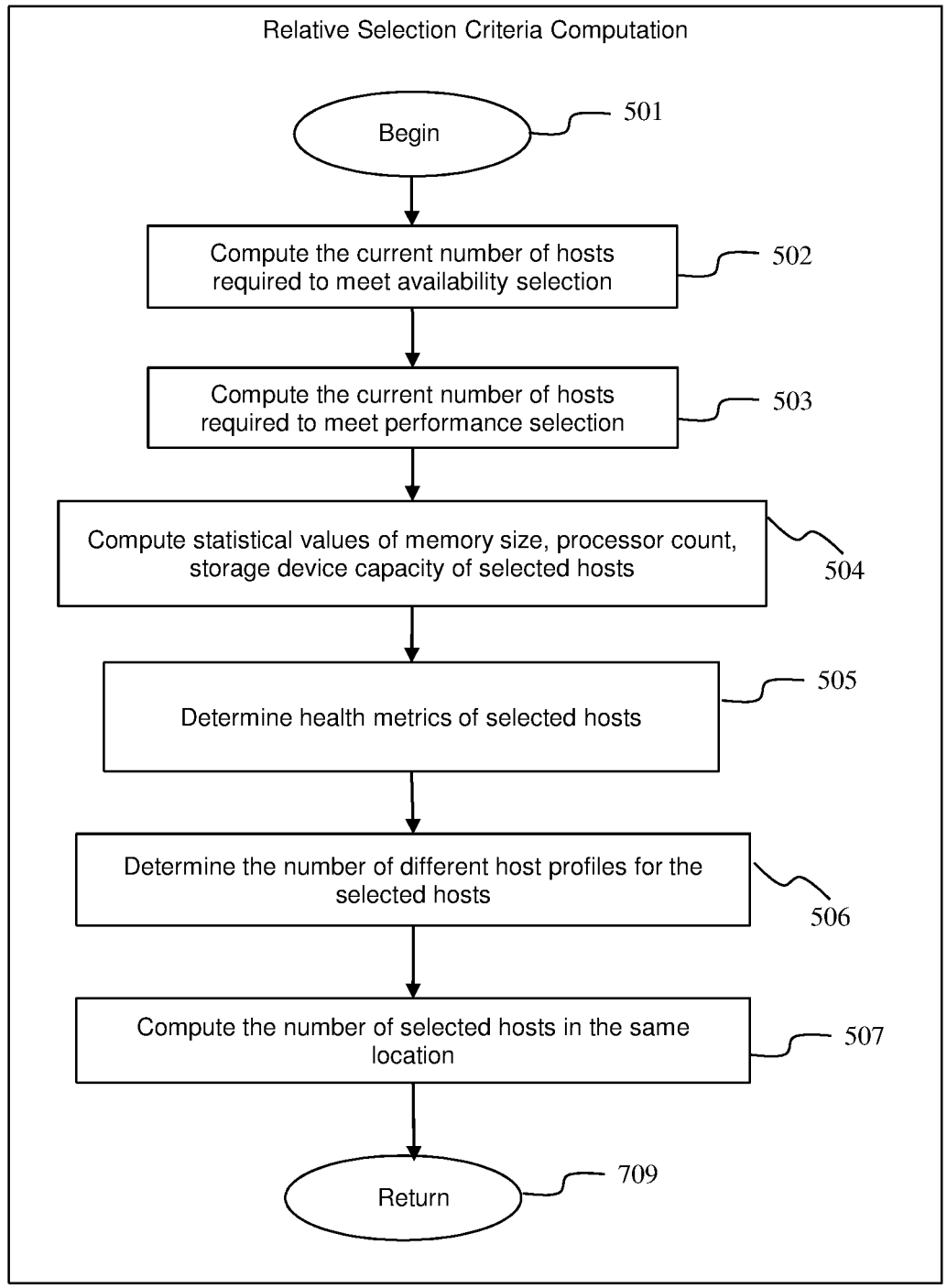
FIG. 5 is a process flow diagram of a relative selection criteria computation executed during the automatic host recommendation process in accordance with an embodiment of the invention.

FIG. 5 is a process flow diagram of the relative selection criteria computation, which is executed at block 402 in the automatic host recommendation process illustrated in FIG. 4, in accordance with an embodiment of the invention. The relative selection criteria computation begins at block 501 as part of the automatic host recommendation process illustrated in FIG. 4. Next, at block 502, the number of hosts required to meet the selected availability for the workload domain is computed based on aggregated availability of the already selected hosts for the workload domain. This number can then be used as a relative selection criterion for potential hosts to help meet the selected availability for the workload domain, if needed. Next, at block 503, the number of hosts required to meet the selected performance for the workload domain is computed based on the aggregated performance of the already selected hosts for the workload domain. Again, this number can then be used as a relative selection criterion for potential hosts to help meet the selected performance for the workload domain, if needed.

Next, at block 504, statistical values of memory size, processor count and storage device capacity of the already selected hosts for the workload domain are computed. These statistical values can be any statistical value for the host properties of the already selected hosts for the workload domain, such as the mean, the standard deviation, the most populate value (i.e., the most repeated or common value) and the variance. These statistical values can be used as baselines to compare potential hosts to already selected hosts to determine whether the potential hosts meet or are close to the statistical values. Some of the statistical values can be made into pass/fail binary relative selection criteria. For example, the standard deviation of memory size values of already selected hosts can be used to determine whether a potential host is within the standard deviation (pass) or is outside of the standard deviation (fail). In some implementations, a numerical value of "0" can be used to indicate a "pass" and a numerical value of "1" can be used to indicate a "fail." Some of the statistical values can be made into non-binary relative selection criteria. For example, the mean of memory size value of already selected hosts can be used to determine how far the memory size value of a potential host is away from the mean of memory size values of already selected hosts. In some implementations, a numerical value of "0" can be used to indicate that a particular property of a potential host exactly matches the statistical value for that host property and a numerical value between "0" to "1", including "1", can be used to indicate how far the value of the particular property of the potential host is away from the statistical value, where the numerical value increases as the property value of the potential host is farther away from the statistical value.

Next, at block 505, health metrics of the already selected hosts for the workload domain is determined. Monitoring tools can be used to analyze host/virtual machine log files to detect problems (e.g., the Log Insight™ component 207). As such, health metrics for hosts are available, which may include numbers of host alarms for different alarm types (e.g., vSphere yellow and red alarms and red alarms). These health metrics of the already selected hosts can then be used as a relative selection criterion to select potential hosts with similar health metrics as the already selected hosts for the workload domain. As an example, the health metrics may be used to create a selection criterion having a health range, e.g., 1-4 alarms, as a pass/fail relative selection criterion. Alternatively, these health metrics may be used to as baselines to determine how similar potential hosts are to the already selected hosts for the workload domain with respect to their health.

Next, at block 506, the number of different host profiles for the workload domain is determined based on the already selected hosts for the workload domain. If there is a maximum number of different host profiles allowed for the workload domain, which may be set by default or user input, the current number of different host profiles for the workload domain can be used as a relative selection criterion to see if potential hosts with another different host profiles can be selected. For example, if the already selected hosts have three different host profiles, which is the maximum number of different host profiles allowed for the workload domain, then only potential hosts with these three host profiles can be considered. In an embodiment, the host profiles may be descriptions of configuration settings of VMware ESX®/ESXi™ hosts.

Next, at block 507, the number of already selected hosts in the same location for the workload domain is computed. If there is a maximum number of hosts allowed for the same location, which may be set by default or user input, the current number of already selected hosts in the same location for the workload domain can be used as a relative selection criterion to see if potential hosts in the same location can be selected.

Next, at block 508, the computed relative selection criteria for the workload domain are returned. In other embodiments, not all of these relative selection criteria for the workload domain are computed and used for the automatic host selection process.

Figure 6:
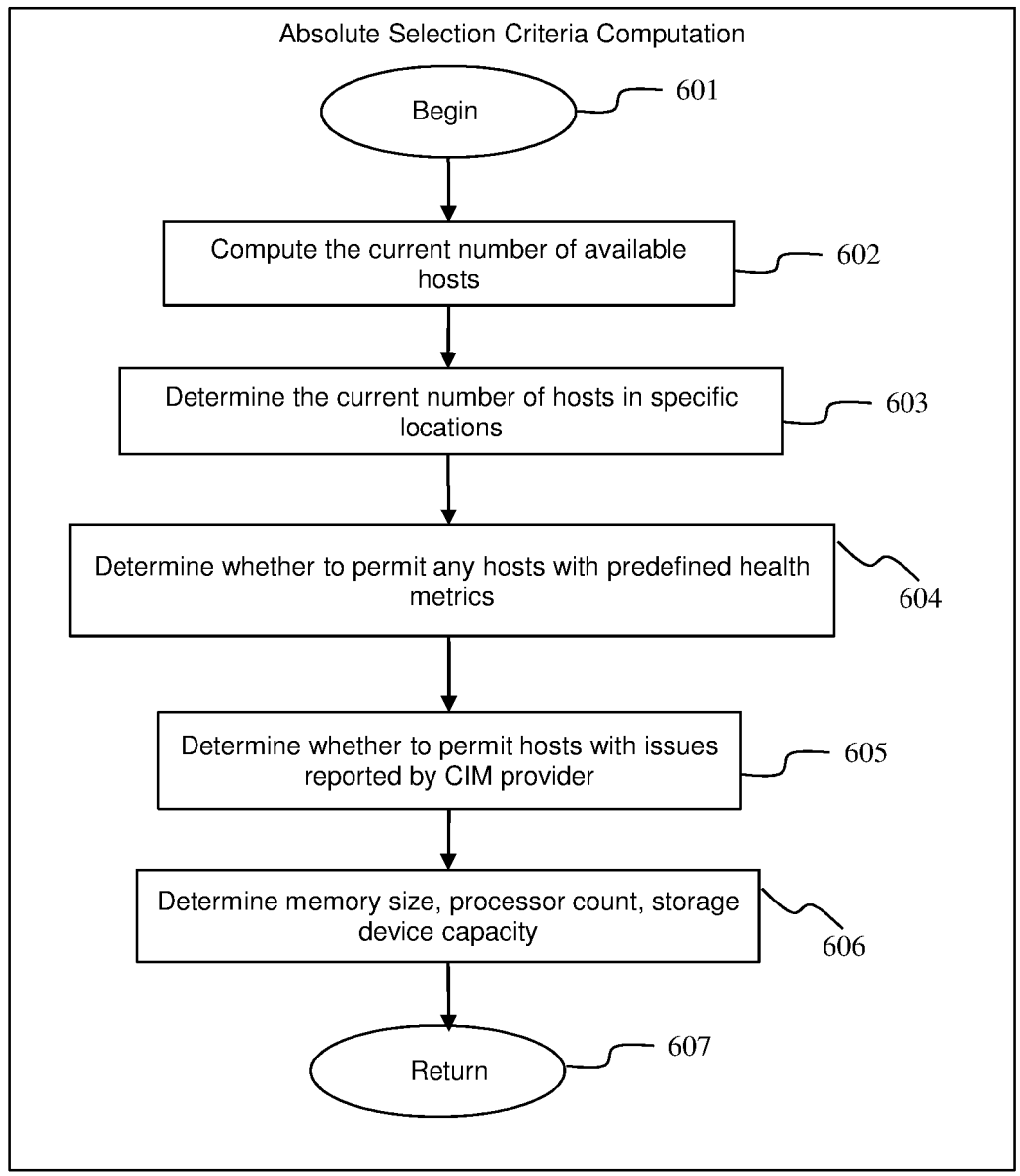
FIG. 6 is a process flow diagram of an absolute selection criteria computation executed during the automatic host recommendation process in accordance with an embodiment of the invention.

FIG. 6 is a process flow diagram of the absolute selection criteria computation, which is executed at block 403 in the automatic host recommendation process illustrated in FIG. 4, in accordance with an embodiment of the invention. The absolute selection criteria computation begins at block 601 as part of the automatic host recommendation process illustrated in FIG. 4. Next, at block 602, the current number of selected hosts for the workload domain is computed. If there is a maximum number of hosts allowed for workload domain, which may be set by default or user input, the current number of already selected hosts for the workload domain can be used as an absolute selection criterion to see how many more potential hosts can be selected for the workload domain.

Next, at block 603, a determination is made which specific host locations are permitted for the workload domain, which may be set by default or user input. The specific host locations can be used as an absolute selection criterion to see which potential hosts can be selected for the workload domain based on their locations.

Next, at block 604, a determination is made whether to permit hosts with predefined health metrics for the workload domain. Such permission for the workload domain may be set by default or user input. Depending on the set permission, an absolute selection criterion can be created to include/exclude potential hosts for the workload domain based on the health metrics of the potential hosts. Predefined health metrics may include host alarms for different alarm types (e.g., vSphere yellow and red alarms).

Next, at block 605, a determination is made whether to permit hosts with issues reported by a common information model (CIM) provider. A CIM provider can be a software or hardware subsystem that monitors a host or a host's components and reports status using a common interface. Such permission for the workload domain may be set by default or user input. Depending on the set permission, an absolute selection criterion can be created to include/exclude potential hosts for the workload domain based on issues reported by a CIM provider.

Next, at block 606, memory size, processor count and storage device capacity allowed for the workload domain are determined. The numerical values of these host properties, which may be set by default or user input, can be used as absolute selection criteria for potential hosts. In some embodiments, exact match may be required for some of these absolute selection criteria as pass/fail selection criteria. In other embodiments, the numerical values of these host properties may be used as comparisons to the corresponding properties of potential hosts.

Next, at block 607, the computed absolute selection criteria for the workload domain are returned. In other embodiments, not all of these absolute selection criteria for the workload domain are computed and used for the automatic host selection process.

Using these relative and absolute criteria, the automatic host recommendation process can provide automatically selected potential hosts in any output format for user selection. FIG. 7 illustrates an example of an output format 700 in the form of a table with n hosts having VC(h, i) criteria values, where VC(h, i) is the output of applying criteria i to host h, in accordance with an embodiment of the invention. The table rows provide the criteria values for each of the n hosts. Each of the n hosts included in the table is a potential host that meets one or more selection criteria, as described above. In this example, there are c different criteria for each of the n hosts. The first column of the table shows host identifications (IDs) for each of the n hosts. Each of the subsequent columns of the table shows criteria values for a particular criterion i for each of the n hosts. Thus, the last column of the table shows criteria values for the criteria c for each of the n hosts.

In this illustrated embodiment, each of the host IDs in the table 700 from 1 to n is a selectable button. Selecting the button selects or deselects the host having that host ID. Thus, selecting a button 701 selects the host having host ID "1", selecting button 702 selects the host having host ID "2", and selecting button 703 selects the host having host ID "n". Selecting an already selected host can deselect that host. In this fashion, when the table 700 is displayed, the hosts in the table can be user selected to be added to the workload domain.

In an embodiment, the criteria values are presented in the table 700 such that the second column "VC(*, 1) includes criteria values for the most important criterion, which is user defined. The third column "VC(*, 2) includes criteria values for the second most important criterion, the fourth column "VC(*, 3) includes criteria values for the third most important criterion, and so on. Thus, the columns (excluding the first far left column for host IDs) are arranged in the table from left to right in the order of decreasing criteria importance. In addition, the rows (excluding the top first row for the table header) are arranged in the table from top to bottom in the order of decreasing criteria values and decreasing criteria importance. In this example, a criteria value of "0" would be the lowest value, which means that the corresponding criterion is met by the corresponding potential host. Since there can be duplicate values in the same column, the rows with the same value in a particular column are arranged using the criteria values in the adjacent right column in the order of decreasing criteria values for each column from left to right starting from the second far left column. The result is a list of potential hosts where the host at the top of the list is the host that best meets the relative and absolute selection criteria in the order of the prioritization of the selection criteria.

The following is a non-limiting example of an algorithm of the automatic host recommendation process illustrated in FIGS. 4-6 that can be implemented by the semi-automatic workload domain deployment manager 103 to produce the table 700 shown in FIG. 7. As input to the automatic host recommendation algorithm, a list of manually selected hosts, a manually ranked set of relative and absolute selection criteria, and selection criteria customization parameters are received. As discussed above, selection criteria are statements that can be applied to a potential host and generate an empirical output—true/false or a number. Examples of selection criteria parameters include the number of configuration issues and the degree to which the hosts should have the same memory size, etc. Some of the selection criteria may be mandatory pass/fail criteria, Next, potential hosts are excluded by the algorithm if they do not meet all mandatory pass/fail criteria. As an example, the pass/fail criteria can include statements that the potential host must be in a given locations or in a group of given locations. The set of remaining hosts can be called the candidate host set.

Next, VC(h, i) criteria values for each of the candidate hosts are computed by the algorithm by going through the candidate host set (excluding the user-selected hosts). Next, an (n+1)-row by (c+1)-column matrix for the table 700 can be created, where n is the number of hosts, and c is the number of selection criteria. The matrix is then populated by, for each host h, inserting into the far-right column, the ID of the h-th host from the candidate set, and inserting the VC(h, i) criteria values for the h-th host in the appropriate columns. The second far left column "VC(*, 1)" in the table 700 should contain the value of the most important criterion, the third far left column "VC(*, 2)" should contain the value for the second most important criterion, etc. In other words, for a given host h, the VC(h, i) values for that host are arranged from left to right in order of decreasing criteria importance. The result will appear similar to the table 700 shown in FIG. 7.

The table 700 can then be sorted by the algorithm as follows. First, the V(*, 1) criteria values are sorted and arranged in ascending order from top to bottom. For each unique value V in this column, the rows with VC(*, 1)=V are selected and sorted in ascending order from top to bottom using the values in the column VC(*, 2) as the key. These steps are then repeated for each of the remaining columns in the table, moving from left to right. The result is a table of prioritized hosts with the hosts ordered top-down by the degree to which they meet the criteria, which allows a user to readily select the desired hosts for the workload domain. The table along with incompatibility messages regarding the excluded hosts and reasons for exclusion may be returned as the output of the algorithm.

Further refinements of the automatic host selection algorithm can include applying a scaling factor to the VC(h, i) output to more heavily increase the more important selection criteria. For example, if there are five criteria, multiply the value of the most important selection criteria by 32, the output for the next most important one by 16, etc.

Another refinement of the automatic host selection algorithm may address the challenge of users ranking more than several criteria. Thus, instead of asking the users to stack rank all the criteria, the algorithm may ask the user to assign each criterion to one of a limited number of groups, e.g., a "critical" group, a "should have" group, and an "optional" group. Then, after computing the VC(h, i) criteria values and before creating the matrix, an aggregate value for each host for each group is computed by summing the VC(h, i) values for all criteria in each of the groups. This operation provides a small set of criteria that can be used, in this case, three values for each host.

In addition, when multiple hosts are preselected, the relative selection criteria on memory size, processor count, storage device, etc. can give best and worst match. If the automatic host selection algorithm on "best" and "worst" results vary, a warning can be issued. For example, if there are hosts with storage capacity such that a host H1 has a storage capacity of c, a host H2 has a storage capacity of 2*c, a host H3 has a storage capacity of 4*c, and a host H4 has a storage capacity of 2*c. When the hosts H1 and H2 are manually selected and the algorithm is executed, the host 4H will have the lowest cost no matter whether compared to the host H1 or to the host H2. But, with other storage capacities, the host H3 would be deemed best when compared to the host H1, and the host H4 best when compared to the host H2. In this situation, the algorithm should report a warning to warn the user that selecting more consistent hosts would yield a better outcome.

Figure 8:
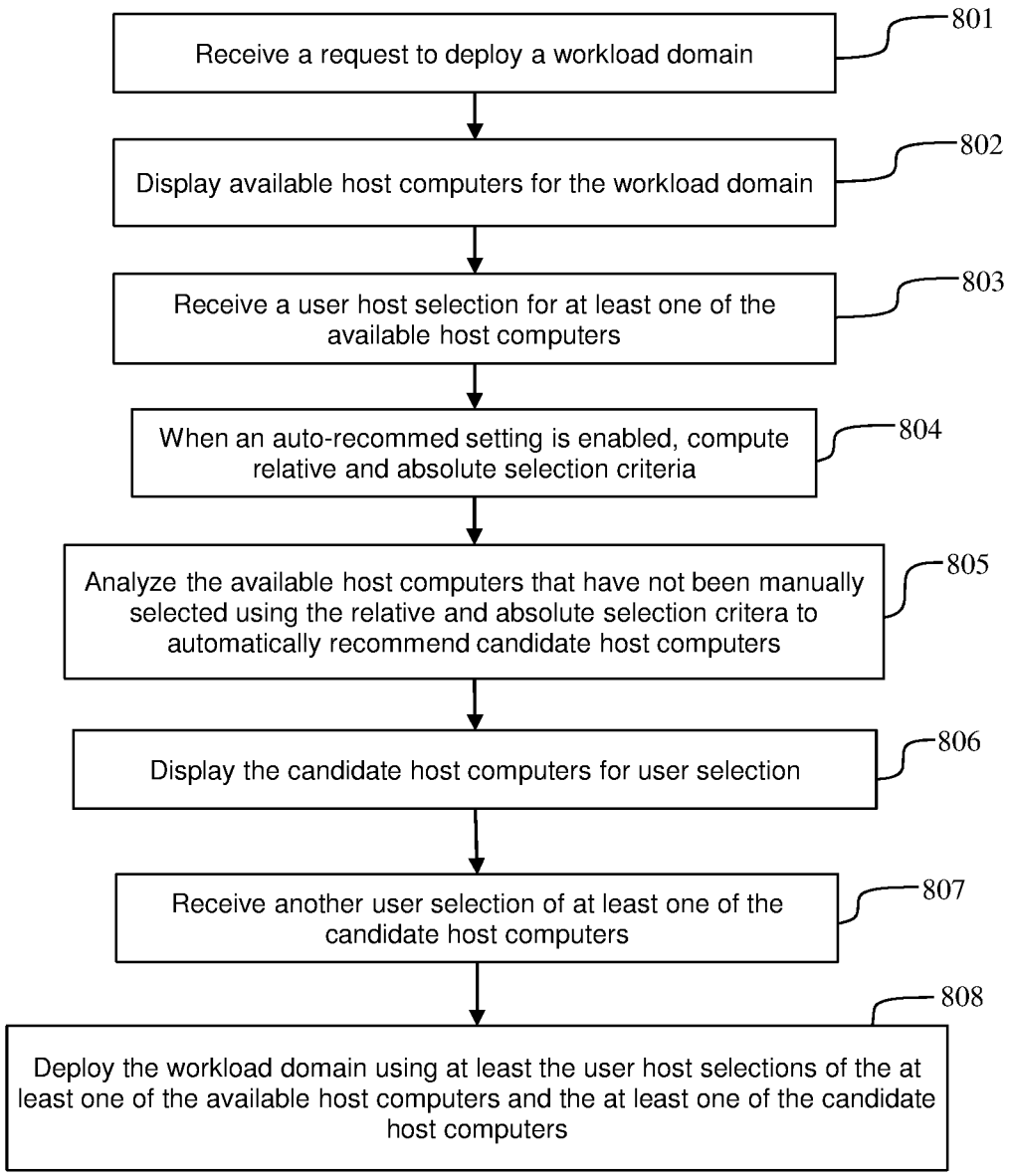
FIG. 8 is a flow diagram of a computer-implemented method for semi-automatic workload domain deployment in a computing environment in accordance with an embodiment of the invention.

A computer-implemented method for semi-automatic workload domain deployment in a computing environment in accordance with an embodiment of the invention is described with reference to a flow diagram of FIG. 8. At block 801, a request to deploy a workload domain is received. At block 802, available host computers for the workload domain is displayed. At block 803, a user host selection of at least one of the available host computers is received. At block 804, when an auto-recommend setting is enabled, relative and absolute selection criteria are computed for automatic host recommendation selection from the available host computers that have not been manually selected. The relative selection criteria include criteria that are based on properties of any manually selected host computers. The absolute selection criteria include criteria that are not based on the properties of any manually selected host computers. At block 805, the available host computers that have not been manually selected are analyzed using the relative and absolute selection criteria to automatically recommend candidate host computers. Each of the candidate host computers meets at least one of the relative and absolute selection criteria. At block 806, the candidate host computers are displayed for user selection. At block 807, another user host selection of at least one of the candidate host computers is received. At block 808, the workload domain is deployed using at least the user host selections of the at least one of the available host computers and the at least one of the candidate host computers.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for semi-automatic workload domain deployment in a computing environment, the computer-implemented method comprising:
   receiving a request to deploy a workload domain;
   displaying available host computers for the workload domain;
   receiving a user host selection of at least one of the available host computers;
   when an auto-recommend setting is enabled, computing relative and absolute selection criteria for automatic host recommendation from the available host computers that have not been manually selected, the relative selection criteria including criteria that are based on properties of any manually selected host computers, the absolute selection criteria including criteria that are not based on the properties of any manually selected host computers, wherein the relative selection criteria include comparisons of a property of an available host computer to a statistical value of the same property of the any manually selected host computers, wherein the property is one of memory size, processor count and storage device capacity;
   analyzing the available host computers that have not been manually selected using the relative and absolute selection criteria to automatically recommend candidate host computers, each of the candidate host computers meeting at least one of the relative and absolute selection criteria;
   displaying the candidate host computers for user selection;
   receiving another user host selection of at least one of the candidate host computers; and
   deploying the workload domain using at least the user host selections of the at least one of the available host computers and the at least one of the candidate host computers.

2. The computer-implemented method of claim 1, wherein analyzing the available host computers that have not been manually selected includes excluding the available host computers that have not been manually selected that do not meet a mandatory pass/fail criterion from the relative and absolute selection criteria.

3. The computer-implemented method of claim 1, further comprising:
   displaying the relative and absolute selection criteria for user prioritization; and
   receiving the user prioritization of the relative and absolute selection criteria so that the candidate host computers are displayed for user selection based on the user prioritization of the relative and absolute selection criteria.

4. The computer-implemented method of claim 3, further comprising:
   computing criteria values of the candidate host computers for the relative and absolute selection criteria, each criteria value being a result of one of the relative and absolute selection criteria being applied to a particular candidate host computer; and
   sorting the candidate host computers in a particular order based on the criteria values.

5. The computer-implemented method of claim 4, wherein sorting the candidate host computers includes sorting the candidate host computers in the particular order using the criteria values of the highest prioritized criteria of the user prioritization.

6. The computer-implemented method of claim 1, wherein the relative selection criteria include comparisons of a health metric of an available host computer to health metrics of the manually selected host computers.

7. The computer-implemented method of claim 1, wherein the absolute selection criteria include at least one criterion based on memory size, processor count, storage device.

8. A non-transitory computer-readable storage medium containing program instructions for a method for semi-automatic workload domain deployment in a computing environment, wherein execution of the program instructions by one or more processors of a computer system causes the one or more processors to perform steps comprising:
   receiving a request to deploy a workload domain;
   displaying available host computers for the workload domain;
   receiving a user host selection of at least one of the available host computers;
   when an auto-recommend setting is enabled, computing relative and absolute selection criteria for automatic host recommendation from the available host computers that have not been manually selected, the relative selection criteria including criteria that are based on properties of any manually selected host computers, the absolute selection criteria including criteria that are not based on the properties of any manually selected host computers, wherein the relative selection criteria include comparisons of a property of an available host computer to a statistical value of the same property of the any manually selected host computers, wherein the property is one of memory size, processor count and storage device capacity;
   analyzing the available host computers that have not been manually selected using the relative and absolute selection criteria to automatically recommend candidate host computers, each of the candidate host computers meeting at least one of the relative and absolute selection criteria;
   displaying the candidate host computers for user selection;
   receiving another user host selection of at least one of the candidate host computers; and
   deploying the workload domain using at least the user host selections of the at least one of the available host computers and the at least one of the candidate host computers.

9. The non-transitory computer-readable storage medium of claim 8, wherein analyzing the available host computers that have not been manually selected includes excluding the available host computers that have not been manually selected that do not meet a mandatory pass/fail criterion from the relative and absolute selection criteria.

10. The non-transitory computer-readable storage medium of claim 9, wherein the steps further comprise:
    computing criteria values of the candidate host computers for the relative and absolute selection criteria, each criteria value being a result of one of the relative and absolute selection criteria being applied to a particular candidate host computer; and
    sorting the candidate host computers in a particular order based on the criteria values.

11. The non-transitory computer-readable storage medium of claim 8, wherein the steps further comprise:
    displaying the relative and absolute selection criteria for user prioritization; and receiving the user prioritization of the relative and absolute selection criteria so that the candidate host computers are displayed for user selection based on the user prioritization of the relative and absolute selection criteria.

12. The non-transitory computer-readable storage medium of claim 11, wherein sorting the candidate host computers includes sorting the candidate host computers in the particular order using the criteria values of the highest prioritized criteria of the user prioritization.

13. The non-transitory computer-readable storage medium of claim 8, wherein the relative selection criteria include comparisons of a health metric of an available host computer to health metrics of the manually selected host computers.

14. The non-transitory computer-readable storage medium of claim 8, wherein the absolute selection criteria include at least one criterion based on memory size, processor count, storage device.

15. A system comprising:
memory; and
at least one processor configured to:
receive a request to deploy a workload domain;
display available host computers for the workload domain;
receive a user host selection of at least one of the available host computers;
when an auto-recommend setting is enabled, compute relative and absolute selection criteria for automatic host recommendation from the available host computers that have not been manually selected, the relative selection criteria including criteria that are based on properties of any manually selected host computers, the absolute selection criteria including criteria that are not based on the properties of any manually selected host computers, wherein the relative selection criteria include comparisons of a property of an available host computer to a statistical value of the same property of the any manually selected host computers, wherein the property is one of memory size, processor count and storage device capacity;
analyze the available host computers that have not been manually selected using the relative and absolute selection criteria to automatically recommend candidate host computers, each of the candidate host computers meeting at least one of the relative and absolute selection criteria;
display the candidate host computers for user selection;
receive another user host selection of at least one of the candidate host computers; and
deploy the workload domain using at least the user host selections of the at least one of the available host computers and the at least one of the candidate host computers.

16. The system of claim 15, wherein the at least one processor is configured to exclude the available host computers that have not been manually selected that do not meet a mandatory pass/fail criterion from the relative and absolute selection criteria.

17. The system of claim 15, wherein the at least one processor is further configured to:
display the relative and absolute selection criteria for user prioritization; and
receive the user prioritization of the relative and absolute selection criteria so that the candidate host computers are displayed for user selection based on the user prioritization of the relative and absolute selection criteria.

18. The system of claim 17, wherein the at least one processor is further configured to:
compute criteria values of the candidate host computers for the relative and absolute selection criteria, each criteria value being a result of one of the relative and absolute selection criteria being applied to a particular candidate host computer; and
sort the candidate host computers in a particular order based on the criteria values.

* * * * *